March 12, 1968

R. R. PRATER 3,372,752

HYDRAULIC FRACTURING

Filed April 22, 1966

INVENTOR.
Ronald R. Prater
BY
C. U. Carlin
ATTORNEY

March 12, 1968

R. R. PRATER 3,372,752

HYDRAULIC FRACTURING

Filed April 22, 1966

INVENTOR.
Ronald R. Prater
BY
C.U.Carlin

ATTORNEY

United States Patent Office 3,372,752
Patented Mar. 12, 1968

3,372,752
HYDRAULIC FRACTURING
Ronald R. Prater, Great Bend, Kans., assignor to The Dow Chemical Company, Midland, Mich., a corporation of Delaware
Filed Apr. 22, 1966, Ser. No. 544,570
7 Claims. (Cl. 166—42)

ABSTRACT OF THE DISCLOSURE

A method of fracturing a well employing at least two piping systems or injection means which provide independent injection of different fluids simultaneously down the wellbore penetrating a formation being treated. Down one of such means is injected a fluid of a density which corresponds closely to that of the fluid in the formation desired to be produced and carries suspended therein a propping agent of about the same density as that of the fluid and down each of said other injection means is injected a fluid of a density which is either greater or less than that of the fluid sought to be produced and which contains substantially no propping agent in suspension.

---

Figure 1:
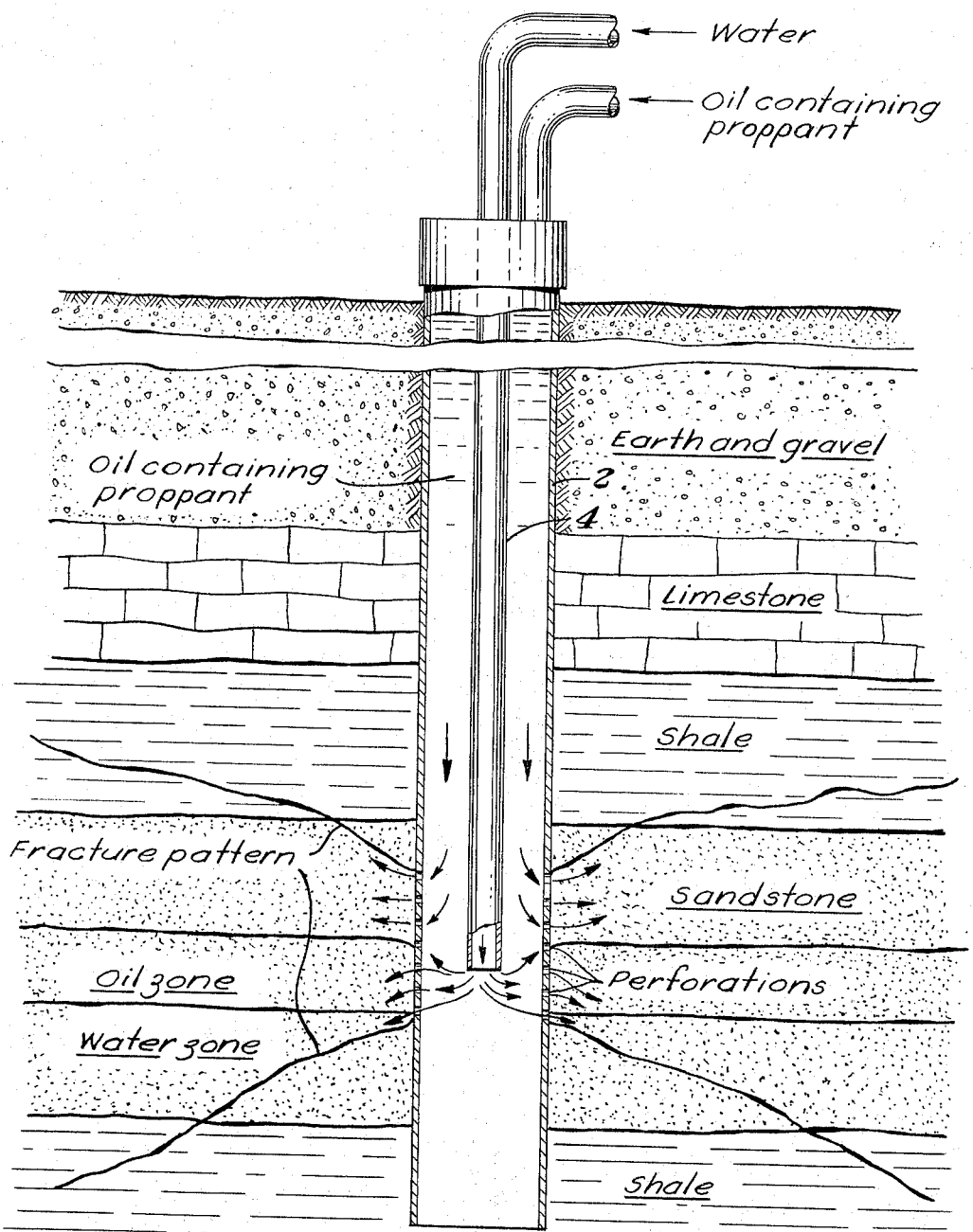

The invention is an improved method of fracturing subterranean fluid-bearing formations to improve fluid communication therein and to stimulate production therefrom.

The term fracturing as used herein means hydraulic fracturing whereby a fluid is injected down a well penetrating a subterranean formation under sufficient pressure to force fluid into the formation and create fractures therein. Examples of fracturing fluids are oil, water, gelled water, gelled brine, acid, and oil and water emulsions. There may advantageously be present in the fluid certain additives among which are those that lessen loss of fluid into a porous formation known as fluid-loss control agents; additives to reduce turbulence during injection, known as friction-loss control agents; additives which are relatively insoluble particulate granules which are forced into fractures as they are created, lodged therein, and thus lessen the tendency of the fracture to close up or heal after the fracturing pressure has been released. These granules are known as propping agents, usually referred to hereafter as proppants. A proppant, as used herein, accordingly means a suitable propping agent for hydraulic fractures which is particulated solid of a size between about 4 mesh and 100 mesh, usually between about 8 and 40 mesh and preferably consists of rounded particles of a rather narrow distribution range, and which is substantially insoluble in both the injected fluids and fluids in the formation. Sand is the most widely used proppant employed in hydraulic fracturing. Other proppants are ground nut shell, ground seed, and other particulated organic fibrous materials, hardened resins, glass beads, and metal pellets. A proppant is almost universally required to be present in a successful fracturing operation. Most fractures below the level of about 3,000 feet are thought to be substantially vertical fractures, that is they extend largely up and down in the formation or more-or-less at right angles to the earth's surface, rather than horizontally.

There are difficulties associated with fracturing employing a proppant, principal among which are those concerned with poor distribution of the proppant. For example, at relatively high concentrations the proppant sometimes drops out or screens out near the wellbore, thereby failing to be carried out into the fracture, resulting in inadequately propped fractures except in the immediate vicinity of the wellbore and often also resulting in premature shut-down of the fracturing operation. At relatively low concentrations of proppant, only a part of the fractures created are propped, e.g. when a relatively dense proppant such as sand is so employed, only the lower part of a vertical fracture is generally propped.

Fluid-bearing portions of a formation very often contain liquids of different densities, e.g. oil below which is brine or water and/or above which is gas. The extent and direction of fractures have been difficult to predict or control. Accordingly, fractures intended to open up only the oil-bearing strata extend up into gas producing zones and down into brine or water producing zones. When a proppant is employed which is heavier than the fracturing fluid, the proppant is largely carried into the lower portion of the fractures including those which extend into water zones. As a result, the water zone fractures are propped open and often the oil-bearing portion of the formation receives insufficient proppant and the fractures created therein close up or heal following release of pressure on the fracturing fluid.

It has been suggested, e.g. in U.S. Patent 3,127,937, that a proppant may be selected which is of similar density to the fracturing fluid employed. This concept has been of value. However, it does not fully meet the difficulties above described.

The present invention is an improvement over the principle described in the above numbered patent.

The invention is directed to a method of fracturing a subterranean formation which contains at least two fluids of different densities which are located in superimposed strata substantially in accordance with their densities. In the practice of the invention, at least two piping systems or injection means are employed which provide independent injection of different fluids simultaneously down the wellbore penetrating a formation being treated. Down one of such means is injected a fluid of a density which corresponds closely to that of the fluid in the formation desired to be produced and carries suspended therein a propping agent at least about 0.1 pound thereof per gallon of suspending fluid of about the same density as that of the fluid and down each of said other injection means is injected a fluid of a density which is either greater or less than that of the fluid sought to be produced and which contains substantially no propping agent in suspension. It is recommended that the density of the fluid containing no propping agent differ from that of the fluid containing propping agent by at least 0.1 gram per cubic centimeter, i.e., that the fluid containing no propping agent be at least 0.1 gram lighter or 0.1 gram per cubic centimeter heavier than the injected fluid having a density which corresponds closely to that of the fluid in the formation desired to be produced.

To illustrate, a situation wherein the practice of the invention is particularly appropriate occurs where brine, oil, and gas are all present in a geologic formation to be fractured. To practice the invention, fracturing fluids employed may be (1) $CCl_4$ without a proppant, (2) water containing a proppant therein having a specific gravity of about one, i.e. about that of water, and (3) a petroleum base oil having a specific gravity of less than one without a proppant therein. A suitable proppant to use in the water is ground nutshell, e.g. walnut shell of 20 to 40 mesh. Each of the $CCl_4$, water plus proppant, and oil, e.g. diesel oil or kerosene, are independently pumped down the wellbore, through separate systems, into the formation at substantially the same time at fracturing pressures. Since the oil-bearing zone is located between the water-bearing and the gas-bearing zones, the fractures created in the oil zone are thus propped open by the nutshell particles because the proppant is of a density which remains largely in the water and locates chiefly between the injected petroleum base oil above and the $CCl_4$ below. When so used, the fractures thereby created which extend into the water zone and those that extend into the gas zone, having little or no proppant lodged therein, heal or close following release of pressures employed during fracturing.

A further illustration of a situation wherein the practice of the invention is applicable is where a geologic formation is to be fractured which consists of superimposed gas on water. It is desired that fractures be created which extend into and are propped open in the gas zone but not in the water zone any more than can be prevented. For such purpose a fracturing fluid, e.g. water containing no proppant, and a light oil containing a lightweight proppant, e.g. aerated glass beads which have a specific gravity of about 0.7, are simultaneously injected through separate systems down the wellbore and into the formation. In this instance the proppant remains in the lighter oil in the upper part of the fracture zone and props open the fractures extending into the gas region but the fractures in the water region which are not desired are allowed to close up or heal after the fracturing pressure has been released.

In the practice of the invention a demulsifying agent may be advantageously used, when the oil and water employed indicate a tendency to emulsify, to inhibit emulsification at the interface in the formation.

Reference to the drawing will help in understanding the description of the invention.

In FIGURE 1 there is shown a subterranean formation penetrated by wellbore. The formation comprises a nearsurface layer of earth and gravel, limestone immediately below, and followed in descending order by an upper shale bed and a sandstone fluidbearing stratum wherein an oil zone is superimposed over a water zone as identified therein. A second shale bed lies below the sandstone. Casing 2 is shown with perforations at the fluid-bearing sandstone level. Tubing 4 is shown extending down to a level a short distance below the lower perforations. Water containing no propping agent is shown being injected down the tubing and oil with a propping agent of a specific gravity of about that of the oil is shown being injected down the annulus between the tubing and casing. Both are being injected at fracturing pressures. A vertical fracture pattern is indicated as extending radially from the perforations into both the oil and water zones. Surface pressure is then released and excess fracturing fluid reversed or flowed back out of the well.

Figure 2:
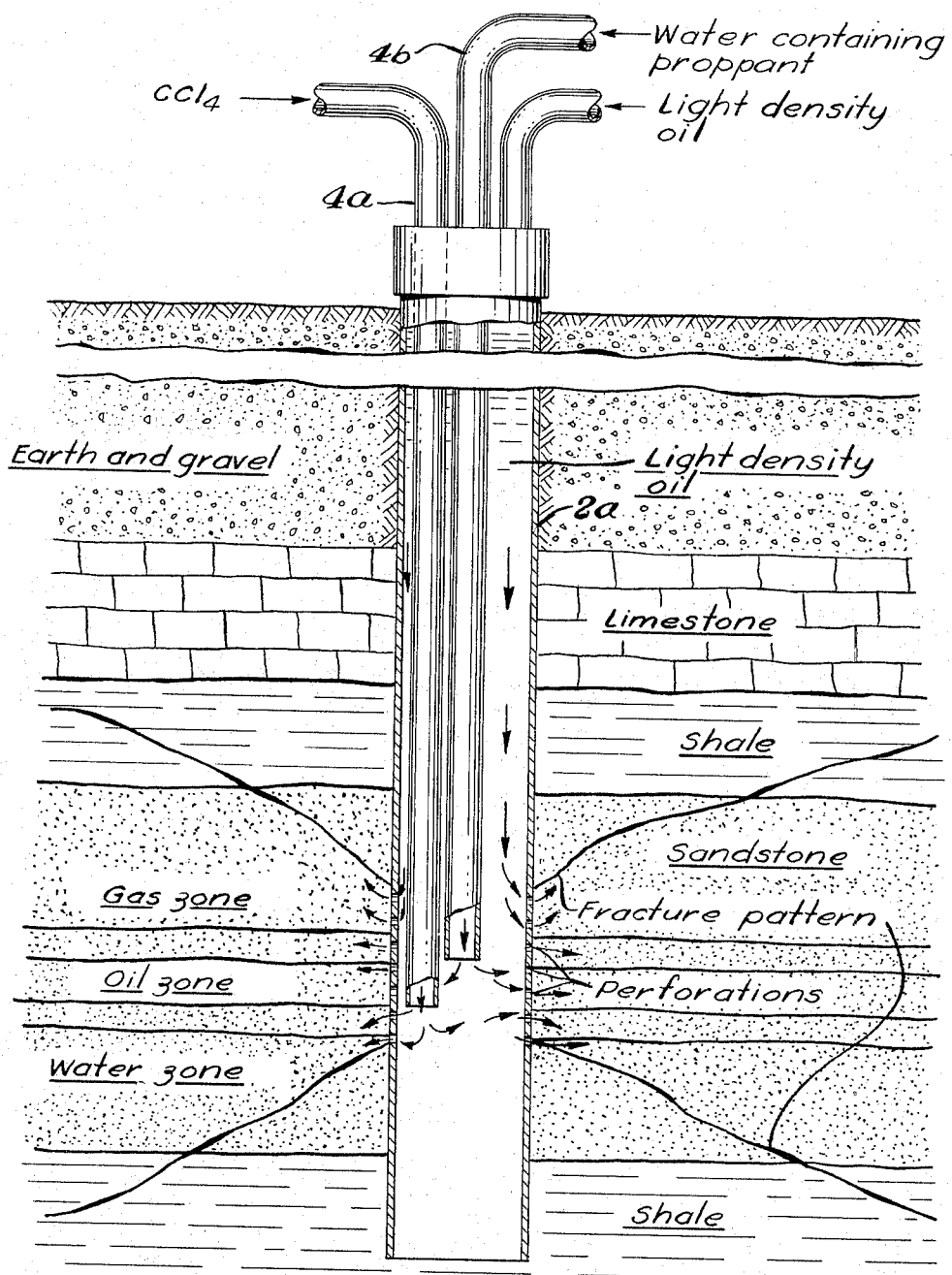

In FIGURE 2 there is shown a subterranean formation comprising substantially the same strata as represented in FIGURE 1 but wherein the sandstone stratum contains three substantially horizontal fluids in juxtaposition, viz. an oil zone superimposed on a water zone and underlying a gas zone. Casing 2a is shown perforated at the fluid-bearing sandstone stratum as in FIGURE 1. However, casing 2a is provided with two sets of tubing, 4a and 4b. $CCl_4$ is shown being injected down tubing 4a, water plus propping agent (of substantially the same specific gravity as water) injected down the tubing 4b, and a relatively light density oil being injected down the casing. No proppant is contained in the $CCl_4$ or in the light density oil. The pressure of injection of all liquids is sufficient to fracture the sandstone. $CCl_4$ is shown being forced into the water zone; the water containing the propping agent into the oil zone; and the light density oil into the gas zone, all at fracturing pressures. Pressure on the fracturing liquids is thereafter released and substantially all of the fracturing fluid is then removed from the well.

In the preferred mode of operation of this invention, the fluid carrying the proppant is treated, or is so selected, to have a low rate of filtration loss into the formation into which it is injected. The fluid or fluids not carrying proppants, and being injected against and into adjacent formation or formations, are selected to have a high rate of filtration loss. By using such fluids in the practice of the invention, the fracturing of the formation will be substantially in that portion treated with the fluid carrying the proppant. Further, if fractures do occur where the high filtration rate fluids are employed, these fractures will not propagate as rapidly as where the low filtration fluid is used; consequently the need for fracturing in a specific section of the formation is more adequately satisfied.

It is believed fracturing occurs preferentially in the formation zone contacted by the low filtration rate fluid because the hydraulic force of the fracturing process is concentrated against the formation; in contrast the hydraulic forces of the high filtration rate or high fluid loss fluid are distributed within the formation as the fluid penetrates therein. Additives to minimize the filtrate or fluid loss rate of fracturing fluids are well known. For example, U.S. Patent 2,779,735 teaches additives for nonaqueous fluids and U.S. Patent 3,153,450 teaches additives for aqueous fluids. Also the fluid may characteristically have a low filtration rate because of suspended asphaltic or paraffinic solids. This is true of many semirefined oils and weathered crude oils. Satisfactory filtration or fluid loss rates for the fluid carrying the proppants are on the order of 15 to 30 ml. in 30 minutes when determined according to the procedure of Standard Field Procedure for Testing Drilling Fliuds API RP29, 3rd Edition (May 1950). The high filtration rate fluids satisfactory for use in this invention have fluid loss rates exceeding about 30 ml. per minute.

In the practice of the invention as illustrated in the drawing, although the fracturing patterns produced include fractures extending into the gas zone or gas and water zones (as well as into the oil zone), the propping agent is largely confined to deposition thereof in those portions of the fractures that are created in the oil zone. This desired effect is obtained because the propping agent, being present only in the intermediate density fracturing liquid and being of a density not substantially different from that of the intermediate fracturing liquid, is not carried by the lightest and heaviest density liquids employed. Accordingly, upon release of surface pressure and removal of the fracturing liquids, any fractures in the gas and water zones tend largely to close or heal but those in the oil zone remain propped open.

Having described by invention what I claim and desire to protect by Letters Patent is:

1. In a method of fracturing a fluid-bearing subterranean formation to stimulate the production of a fluid from the formation comprising at least two zones in substantially horizontal juxtaposition each of which bears a fluid of a different density than that in the other zone but only one of such fluids is desired to be produced and wherein such method requires a fluid containing a proppant to be injected into the formation at greater than fracturing pressures to create fractures therein, the improvement which consists essentially of independently injecting, substantially concurrently, at least two substantially immiscible fluids of different densities, one of such fluids having suspended therein at least about 0.1 pound of a particulate solid propping agent, substantially insoluble in the injected fluids and in the fluids in the formation, per gallon of suspending fluid, and being of a density such that it tends to enter the formation at the level of the zone bearing the fluid desired to be produced and the other fluids injected being of a density unlike that of the fluid desired to be produced and which contain substantially no propping agent; forcing the fluids so injected into the formation at fracturing pressures whereby the formation is fractured and the fluid containing the propping agent is forced into the zone bearing the fluid sought to be produced, depositing propping agent in the fractures created therein, and the other fluids being forced into zones which do not bear a fluid desired to be produced and which do not deposit any appreciable amount of propping agent in the fractures in such zones; releasing pressure on the so injected fluids whereupon the fractures containing no appreciable amount of propping agent tend to heal substantially.

2. The method according to claim 1 wherein the fluid-bearing formation comprises an oil-bearing zone superimposed on an aqueous fluid-bearing zone, and two substantially immiscible fluids of different densities are injected independently and substantially concurrently, one of said fluids consisting essentially of a carrier liquid selected from the class consisting of oil, water, brine, and gelled and emulsified mixtures thereof and containing a proppant of a density not substantially greater than said carrier liquid and the other of said fluids being a liquid substantially immiscible therewith and having a density at least 0.1 gram per cubic centimeter greater than that of said carrier liquid and containing substantially no proppant.

3. The method according to claim 1 wherein the fluid-bearing formation comprises an oil-bearing zone having a gas-bearing zone superimposed thereon and underlain by an aqueous fluid-bearing zone and three fluids of different densities are injected independently and substantially concurrently, one of said fluids consisting essentially of a carrier liquid selected from the class consisting of oil, water, brine, and gelled and emulsified mixtures thereof and containing a proppant of a density not substantially different from that of said carrier liquid; the second injected fluid consisting essentially of an oil having a density of at least 0.1 gram per cubic centimeter less than that of said carrier liquid and containing substantially no proppant; and the third injected fluid consisting essentially of a liquid having a density at least 0.1 gram per cubic centimeter greater than that of said carrier liquid and containing substantially no proppant.

4. The method according to claim 1 wherein the fluid-bearing formation comprises a gas-bearing zone superimposed on an oil-bearing zone and one of two fluids of different density injected substantially concurrently consists essentially of an aqueous carrier liquid containing a proppant which has a density at least as great as that of the aqueous carrier liquid and the other fluid injected is an oil having a density less than that of said aqueous carrier liquid and contains substantially no proppant.

5. The method according to claim 4 wherein said aqueous carrier liquid is selected from the class consisting of water, brine, gelled water, gelled brine, and oil and water emulsions of greater density than the oil comprising the other injected fluid.

6. The method according to claim 4 wherein said proppant is selected from the class consisting of sand, solid resins, glass beads, and metal pellets.

7. In a method of fracturing a fluid-bearing subterranean formation to stimulate the production of a fluid from the formation comprising at least two zones in substantially horizontal juxtaposition each of which bears a fluid of a different density than that in the other zone but only one of such fluids is desired to be produced and wherein such method requires a fluid containing a proppant to be injected into the formation at greater than fracturing pressures to create fractures therein, the improvement which consists essentially of independently injecting, substantially concurrently, at least two substantially immiscible fluids of different densities, one of such fluids having a substantially low filtration rate and having suspended therein at least about 0.1 pound of a particulate solid propping agent, substantially insoluble in the injected fluids and in the fluids in the formation, per gallon of suspending fluid, and being of a density such that it tends to enter the formation at the level of the zone bearing the fluid desired to be produced and the other fluids injected having a substantially high filtration rate and being of a density unlike that of the fluid desired to be produced and which contain substantially no propping agent; forcing the fluids so injected into the formation at fracturing pressures whereby the formation is fractured and the fluid containing the propping agent is forced into the zone bearing the fluid sought to be produced, depositing propping agent in the fractures created therein, and the other fluids being forced without significant fracturing into zones which do not bear a fluid desired to be produced and which do not deposit any appreciable amount of propping agent in the fractures in such zones; releasing pressure on the so injected fluids whereupon the fractures containing no appreciable amount of propping agent tend to heal substantially.

References Cited

UNITED STATES PATENTS

| | | | |
|---|---|---|---|
| 2,596,845 | 5/1952 | Clark | 166—42 X |
| 2,888,988 | 6/1959 | Clark | 166—42 X |
| 2,978,025 | 4/1961 | Clark | 166—42 |
| 3,126,056 | 3/1964 | Harrell | 166—42 |
| 3,127,937 | 4/1964 | McGuire et al. | 166—42 |
| 3,151,678 | 10/1964 | Hanson et al. | 166—42 |
| 3,155,161 | 11/1964 | Tadema | 166—42 |
| 3,224,506 | 12/1965 | Huitt et al. | 166—42 |

ERNEST R. PURSER, *Primary Examiner.*

DAVID H. BROWN, *Assistant Examiner.*